Figure 1:
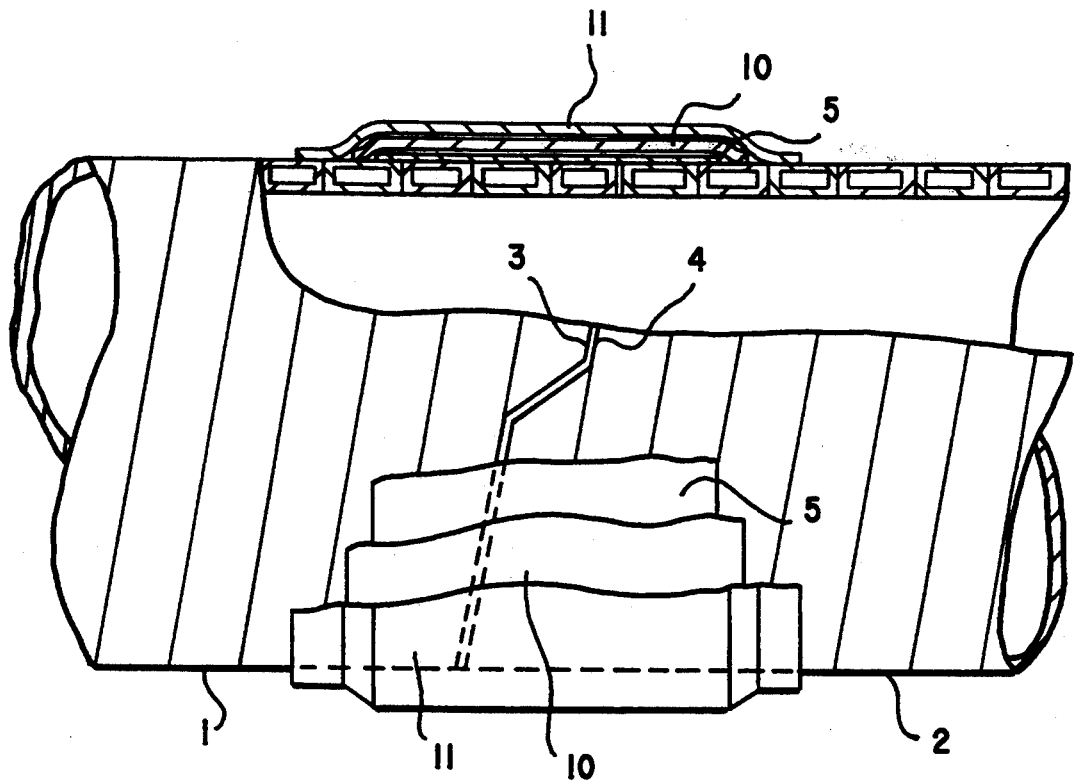

United States Patent [19]

Blomqvist

[11] Patent Number: 5,431,762
[45] Date of Patent: Jul. 11, 1995

[54] METHOD FOR JOINING SPIRALLY WOUND THERMOPLASTIC PIPES TOGETHER

[75] Inventor: Gunnar Blomqvist, Helsingby, Finland

[73] Assignee: OY Kwh Pipe AB, Vasa, Finland

[21] Appl. No.: 137,069

[22] PCT Filed: Jun. 12, 1992

[86] PCT No.: PCT/FI92/00185
§ 371 Date: Oct. 26, 1993
§ 102(e) Date: Oct. 26, 1993

[87] PCT Pub. No.: WO92/22419
PCT Pub. Date: Dec. 23, 1992

[30] Foreign Application Priority Data
Jun. 14, 1991 [FI] Finland ................... 912280

[51] Int. Cl.⁶ ................... B29C 65/30; B29C 65/42
[52] U.S. Cl. ................... 156/158; 156/244.22; 156/304.2; 156/304.5; 156/304.6; 156/309.9; 285/284; 285/330
[58] Field of Search ............... 156/64, 82, 158, 159, 156/244.22, 304.2, 304.3, 304.5, 304.6, 308.4, 309.9; 285/21, 284, 288, 292, 330, 913, 915; 138/109

[56] References Cited

U.S. PATENT DOCUMENTS

| Re. 24,801 | 3/1960 | Kaminsky | 156/304.5 |
| 828,516 | 8/1906 | Schroder | 283/330 |
| 2,220,545 | 11/1940 | Reinhardt | 156/82 |
| 3,022,209 | 2/1962 | Campbell | 285/292 |
| 3,030,246 | 4/1962 | Westlake | 156/304.6 |
| 3,126,306 | 3/1964 | Sherman | 156/244.13 |
| 4,338,153 | 6/1982 | Zimmerman | 156/304.3 |
| 5,009,737 | 4/1991 | Lescaut | 156/309.6 |
| 5,099,888 | 3/1992 | Valls | 138/109 |

FOREIGN PATENT DOCUMENTS

| 0081931 | 6/1983 | European Pat. Off. |
| 2947583 | 4/1987 | Germany . |
| 653951 | 1/1986 | Switzerland . |

*Primary Examiner*—Steven D. Maki
*Attorney, Agent, or Firm*—Armstrong, Westerman, Hattori, McLeland & Naughton

[57] ABSTRACT

A method for joining spirally wound thermoplastic pipes is disclosed. The method includes providing a first spirally wound thermoplastic pipe and a second spirally wound thermoplastic pipe, wherein each thermoplastic pipe includes a spirally wound hollow profile. The method further includes placing the end of the first thermoplastic pipe against the end of the second thermoplastic pipe such that a gap having a step is formed between the end surfaces, applying a stainless steel band over the gap and heating the steel band, positioning an extruder and a slide and smoothing organ inside the thermoplastic pipes, heating the end surface of the first thermoplastic pipe and the end surface of the second thermoplastic pipe with a heating means, and extruding melted thermoplastic from the extruder and into the gap between the end surfaces and applying pressure to the melted thermoplastic with the slide and smoothing organ. Thereafter, the method includes stopping the heating of the steel band, and, finally, cooling the extruded thermoplastic and removing the steel band after the thermoplastic is cooled whereby the thermoplastic pipes are joined together.

8 Claims, 1 Drawing Sheet

METHOD FOR JOINING SPIRALLY WOUND THERMOPLASTIC PIPES TOGETHER

The invention relates to a method for joining spirally wound thermoplastic pipes of a hole profile together.

According to earlier methods, the joining-together of spirally wound pipes of the above-mentioned type usually occurred by means of extruder welding from the outer and inner side of the pipe. Since pipes of very large diameters, 2 m or more, are often concerned, this previously known technique causes considerable technical problems, and it is simultaneously very time-consuming. It was very diffucult to reach a satisfactory final result by means of the previously known technique.

The object of the present invention is to eliminate these problems, which is achieved by means of a method, which is characterized by the following steps:
  working the end surfaces of the sprirally wound thermoplastic pipes into a smooth step-formed surface,
  setting two thermoplastic pipes end against end such that a smooth step-formed gap is formed between the end surfaces,
  applying a stainless steel band over the gap and heating of the steel band to about 100° C.,
  applying an extruder with a rotating extruder head and a cooled slide and smoothing organ cooperating therewith inside the pipes to be joined together, heating the end surfaces,
  extruding a weld seam of a melted thermoplastic into the gap between the two end surfaces, as well as
  stopping the heating of the steel band and removing the steel band from the joining place after cooling.

The remaining characteristics of the invention will be apparent from the following description.

Figure 2:
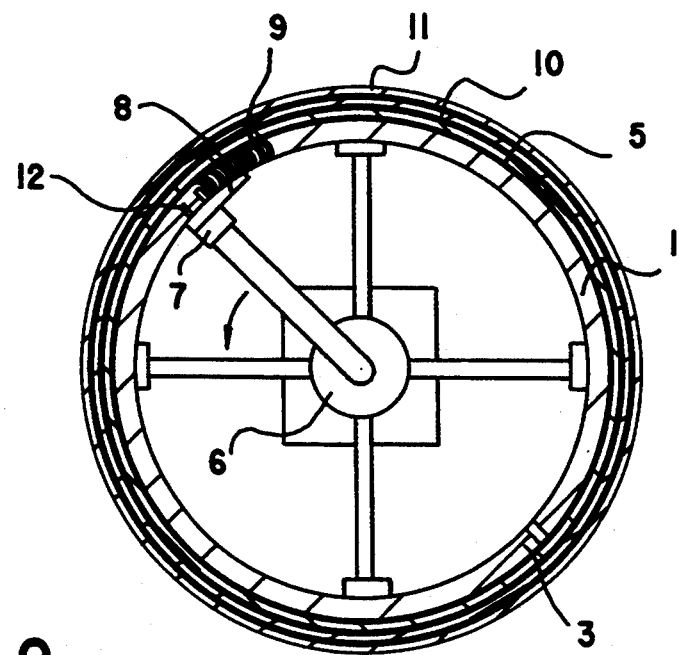

The invention will next be described in more detail with reference to the accompanying drawing, wherein FIG. 1 shows the joining-together of two spirally wound pipes according to the present invention, seen from the outside in a radial direction, and FIG. 2 shows the joining-together of FIG. 1, seen in an axial direction.

The joining-together of spirally wound thermoplastic pipes 1, 2 made of a hole profile occurs according to the invention as follows. The ends of the two thermoplastic pipes 1, 2 to be joined together are worked such that an end opening of the corresponding hole profile is closed and two smooth step-formed end surfaces 3, 4, which fit together, are obtained, whereafter the two pipes are placed end against end and set such that a uniformly wide step-formed gap (a gap having a step) forms between the end surfaces 3 and 4. The gap width is to be fitted according to the radial dimension of the hole profile, of which the spirally wound pipe 1, 2 is comprised. In connection with the most usual pipe dimensions, the gap width varies in the range of 10–40 mm. A stainless steel band 5 is applied over the gap between the two thermoplastic pipes 1, 2 and is heated to about 100° C. In order to avoid that the melted thermoplastic material will adhere to the steel band 5, it is preferably teflon coated. An extruder 6 with a rotating extruder head 7 and a cooled slide and smoothing organ 8 cooperating therewith are applied inside the pipes 1, 2 to be joined together. The end surfaces 3, 4 are heated e.g. with warm air coming from a warm-air blower 12. A weld seam of melted thermoplastic 9 is extruded into the gap between the two end surfaces 3, 4, whereby the slide and smoothing organ 8 brings about the fact that the melted thermoplastic 9 completely fills the gap and a weld pressure is obtained. In this way, a weld seam with a smooth inner surface is formed. After the extrusion of the whole gap is completed, the heating of the steel band 5 is stopped and the extruded thermoplastic seam is cooled, whereafter the steel band 5 is removed from the joining place. A very smoooth seam may then be observed, which is nearly invisible to the naked eye.

According to a preferred embodiment, the heating of the steel band 5 occurs electrically, preferably by short-circuiting.

For setting the temperature of the steel band 5 to the desired level, it may preferably be provided with a temperature sensor coupled to a regulating circuit, which is arranged to regulate the electricity supply to the steel band. That is, the steel band is provided with a temperature sensor and a regulating circuit maintains the temperature of the steel band at a desired level, based upon readings from the temperature sensor.

The joining place, after the steel band 5 has been applied, has preferably to be surrounded with an insulation layer, as well as a felt cloth 10, which is in turn surrounded with a rubber sleeve 11, which prevents moisture and wetness from coming into contact with the steel band 5, which may detrimentally affect the heating cycle.

I claim:
1. A method for joining spirally wound thermoplastic pipes (1, 2) together, comprising the steps of:
  providing a first thermoplastic pipe (1) and a second thermoplastic pipe (2) wherein each thermoplastic pipe comprises a spirally wound hollow profile,
  positioning an end the first thermoplastic pipe (1) adjacent an end of the second thermoplastic pipe (2) such that a gap having a step is formed between an end surface (3) of the end of the first pipe (1) and an end surface (4) of the end of the second pipe (2),
  applying a stainless steel band (5) around the end of the first pipe and the end of the second pipe such that the band is positioned over the gap and heating the steel band,
  placing an extruder (6) and a cooled slide and smoothing organ (8) inside the thermoplastic pipes (1, 2),
  heating the end surfaces (3, 4) with a heating means,
  extruding melted thermoplastic (9) into the gap between the two end surfaces with said extruder, and applying pressure to the melted thermoplastic with the slide and smoothing organ,
  stopping the heating of the steel band, cooling the extruded thermoplastic, and removing the steel band (5) after cooling.

2. A method according to claim 1, wherein the steel band (5) is heated electrically.

3. A method according to claim 2, wherein the steel band (5) is provided with a temperature sensor, and wherein a regulating circuit maintains the temperature of the steel band at a desired level based Upon readings from said temperature sensor.

4. A method according to any one of claims 1-3, wherein said gap is about 10-20 mm wide.

5. A method according to claim 4, wherein the steel band (5) is teflon coated.

6. A method according to claim 5, wherein the steel band is surrounded with a felt cloth (10) and a rubber sleeve (11) surrounds the felt cloth (10).

7. A method according to any one of claims 1-3, wherein the heating means is a warm-air blower (12) and the end surfaces are heated with warm air coming from the warm air blower before the thermoplastic is extruded.

8. A method according to claim 1, wherein said step of heating the steel band includes heating the steel band to about 100° C.

* * * * *

UNITED STATES PATENT AND TRADEMARK OFFICE
CERTIFICATE OF CORRECTION

PATENT NO. : 5,431,762
DATED : July 11, 1995
INVENTOR(S) : Gunnar BLOMQVIST

It is certified that error appears in the above-indentified patent and that said Letters Patent is hereby corrected as shown below:

On the title page, Item [30], Foreign Application Priority Data "Jun. 14, 1991  [FI]    Finland ....... 912280" should read --Jun. 14, 1991  [FI]    Finland ....... 912880--.

Signed and Sealed this

Twenty-sixth Day of December, 1995

Attest:

BRUCE LEHMAN

*Attesting Officer*    *Commissioner of Patents and Trademarks*